US011569921B2

(12) United States Patent
Cohn

(10) Patent No.: US 11,569,921 B2
(45) Date of Patent: Jan. 31, 2023

(54) SYSTEM AND METHOD FOR CAPTURING AND ACCESSING REAL-TIME AUDIO AND ASSOCIATED METADATA

(71) Applicant: Matthew Cohn, Seattle, WA (US)

(72) Inventor: Matthew Cohn, Seattle, WA (US)

( * ) Notice: Subject to any disclaimer, the term of this patent is extended or adjusted under 35 U.S.C. 154(b) by 0 days.

(21) Appl. No.: 16/361,374

(22) Filed: Mar. 22, 2019

(65) Prior Publication Data
US 2020/0304221 A1 Sep. 24, 2020

(51) Int. Cl.
*H04H 40/09* (2008.01)
*G06F 3/16* (2006.01)

(52) U.S. Cl.
CPC ............ *H04H 40/09* (2013.01); *G06F 3/165* (2013.01)

(58) Field of Classification Search
None
See application file for complete search history.

(56) References Cited

U.S. PATENT DOCUMENTS

| 5,457,739 | A | 10/1995 | Le Cheviller |
| 7,340,761 | B2 | 3/2008 | Billmaier |
| 7,698,566 | B1 * | 4/2010 | Stone ............... H04L 63/08 713/186 |
| 7,840,177 | B2 | 11/2010 | DeBusk et al. |
| 8,015,159 | B2 | 9/2011 | Boicey et al. |
| 9,077,581 | B2 | 7/2015 | Moran et al. |
| 9,407,710 | B2 | 8/2016 | Li et al. |
| 2002/0183059 | A1 | 12/2002 | Noreen et al. |
| 2004/0042103 | A1 | 3/2004 | Mayer |
| 2005/0020223 | A1 | 1/2005 | Ellis et al. |
| 2005/0283795 | A1 | 12/2005 | Steelberg et al. |
| 2007/0149114 | A1 | 6/2007 | Danilenko |
| 2009/0228492 | A1 | 9/2009 | Valdez et al. |
| 2009/0249382 | A1 | 10/2009 | Weinblatt |

(Continued)

FOREIGN PATENT DOCUMENTS

EP 2477333 A1 7/2012

OTHER PUBLICATIONS

Brian Lister et al., Managing Radio (2009) (archived by the WayBackMachine, https://web.archive.org/web/20090719084315/http://www.soundconcepts.ltd.uk/managingradio/a211.html, Jul. 19, 2009) (Year: 2009).*

*Primary Examiner* — Walter F Briney, III
(74) *Attorney, Agent, or Firm* — Daniel M. Cohn; Howard M. Cohn

(57) ABSTRACT

Disclosed embodiments provide methods and systems to capture, persist, and access a real-time audio stream and metadata associated with a radio broadcast. The real-time audio stream is captured on an audio capture device comprising a real-time clock. The audio is associated with the points in time it is captured with time markers. In embodiments, the audio is encoded for transmission with the time markers to a remote server. After being captured, encoded, and associated with time markers, the audio is transmitted to a remote server for archiving. Client devices are used to provide access to archived content. Clients request portions of the real-time audio stream from the remote server, and identify the portions they are requesting by including in their request either real-time bounds, or other information which is associated on the remote server with real-time bounds, such as content descriptor types.

6 Claims, 11 Drawing Sheets

(56) References Cited

U.S. PATENT DOCUMENTS

| | | |
|---|---|---|
| 2009/0281897 A1 | 11/2009 | Antos |
| 2009/0305388 A1 | 12/2009 | Dressler et al. |
| 2010/0268690 A1 | 10/2010 | Anderson et al. |
| 2012/0036048 A1* | 2/2012 | Robb ................. G06Q 30/0643 705/27.2 |
| 2013/0254806 A1* | 9/2013 | Alam ................. H04N 21/4143 725/38 |
| 2014/0013367 A1* | 1/2014 | Elhag ................. H04N 21/2385 725/95 |
| 2014/0336797 A1 | 11/2014 | Emerson |
| 2015/0289009 A1 | 10/2015 | Bremm et al. |
| 2016/0127440 A1 | 5/2016 | Gordon |
| 2016/0211930 A1 | 7/2016 | Cipolla |
| 2018/0158485 A1* | 6/2018 | Krahnstoever ...... G11B 27/031 |
| 2019/0082203 A1* | 3/2019 | Bowman ............ H04N 21/2187 |

* cited by examiner

SYSTEM AND METHOD FOR CAPTURING AND ACCESSING REAL-TIME AUDIO AND ASSOCIATED METADATA

CROSS REFERENCE TO RELATED APPLICATIONS

This application is a division of commonly-owned, copending U.S. patent application Ser. No. 15/950,311 entitled SYSTEM AND METHOD FOR CAPTURING AND ACCESSING REAL-TIME AUDIO AND ASSOCIATED METADATA, and filed on Apr. 11, 2018.

FIELD OF THE INVENTION

The present invention relates generally to broadcast monitoring, and more particularly to systems and methods for capturing and accessing real-time audio and associated metadata.

BACKGROUND

There are over 15,000 radio stations in the United States. This includes over 4,000 AM stations, and over 11,000 FM stations. These stations provide content to millions of people each day, at home, work, and in vehicles during commutes and other travelling. Thus, radio continues to reach consumers of media content on a daily basis. Radio delivers content such as news, music, sports, and other content, and continues to be an important source of information for many. Thus, radio is an effective medium for advertising. Recent estimates put the value of the radio advertising industry in excess of 17 billion dollars. Thus, radio is important as both a content delivery mechanism, as well as an advertisement mechanism. It is therefore desirable to have improvements in monitoring of radio broadcasts.

SUMMARY

Embodiments include an electronic device, comprising: a processor; a memory coupled to the processor, the memory containing instructions, which when executed by the processor, perform the steps of: receiving a plurality of audio data files, wherein each of the plurality of audio data files includes associated time-of-day information; receiving one or more pieces of metadata, wherein each of the one or more pieces of metadata comprises a start time and an end time; associating each of the one or more pieces of metadata with one or more audio data files based on the time-of-day information.

Embodiments further can include an electronic device, comprising: a processor; a memory coupled to the processor, the memory containing instructions, which when executed by the processor, perform the steps of: receiving an audio signal; compressing the audio signal; creating a plurality of audio files, wherein each audio file comprises a portion of the compressed audio signal; associating a time of day with each audio file; and transmitting each audio file to a server.

In other embodiments, there is provided an electronic device, comprising: a processor; a memory coupled to the processor, the memory containing instructions, which when executed by the processor, perform the steps of: sending a query to an audio server, wherein the query comprises a time of day, and one or more content descriptor types; sending a manifest request to the audio server for a specified time period; requesting a plurality of audio files from the audio server based on information received from the manifest request; and receiving the plurality of audio files from the audio server, wherein the plurality of audio files corresponds to at least one of the one or more content descriptor types.

BRIEF DESCRIPTION OF THE DRAWINGS

The structure, operation, and advantages of the present invention will become further apparent upon consideration of the following description taken in conjunction with the accompanying figures (FIGs.). The figures are intended to be illustrative, not limiting.

Certain elements in some of the figures may be omitted, or illustrated not-to-scale, for illustrative clarity. The cross-sectional views may be in the form of "slices", or "near-sighted" cross-sectional views, omitting certain background lines which would otherwise be visible in a "true" cross-sectional view, for illustrative clarity. Furthermore, for clarity, some reference numbers may be omitted in certain drawings.

DETAILED DESCRIPTION

Disclosed embodiments provide methods and systems to capture, persist, and access a real-time audio stream and metadata associated with a radio broadcast. A real-time audio stream is audio which is associated with specific points in real-time. For the purposes of this disclosure, real-time is a time as described and measured using a calendar and/or clock. The real-time audio stream is captured on an audio capture device comprising a real-time clock. The audio is associated with the points in time it is captured by using time markers. In embodiments, the audio is encoded for transmission with the time markers to a remote server.

After being captured, encoded, and associated with time markers, the audio is transmitted to a remote server for persistence (archiving) so that it may be later accessed. After arriving at the remote server, it may be further encoded before or while being persisted for later transmission to an electronic client device.

Client devices are used to provide access to archived content. Clients request portions of the real-time audio stream from the remote server. Clients identify the portions they are requesting by including in their request either real-time bounds, or other information which is associated on the remote server with real-time bounds, such as content descriptor types and/or metadata IDs. Clients download the portions of the real-time audio stream as a response from the remote server. When retrieved, clients play back and/or save the portion of the real-time audio stream. Clients can play back the retrieved audio using the client's playback mechanism, which produces an audio output. The output can consist of an analog or digitally encoded signal, and/or provide audible sound by using an embedded or external digital to analog converter (DAC) and/or speaker. Clients can save the retrieved audio to a file on non-volatile storage on the client.

Figure 1:
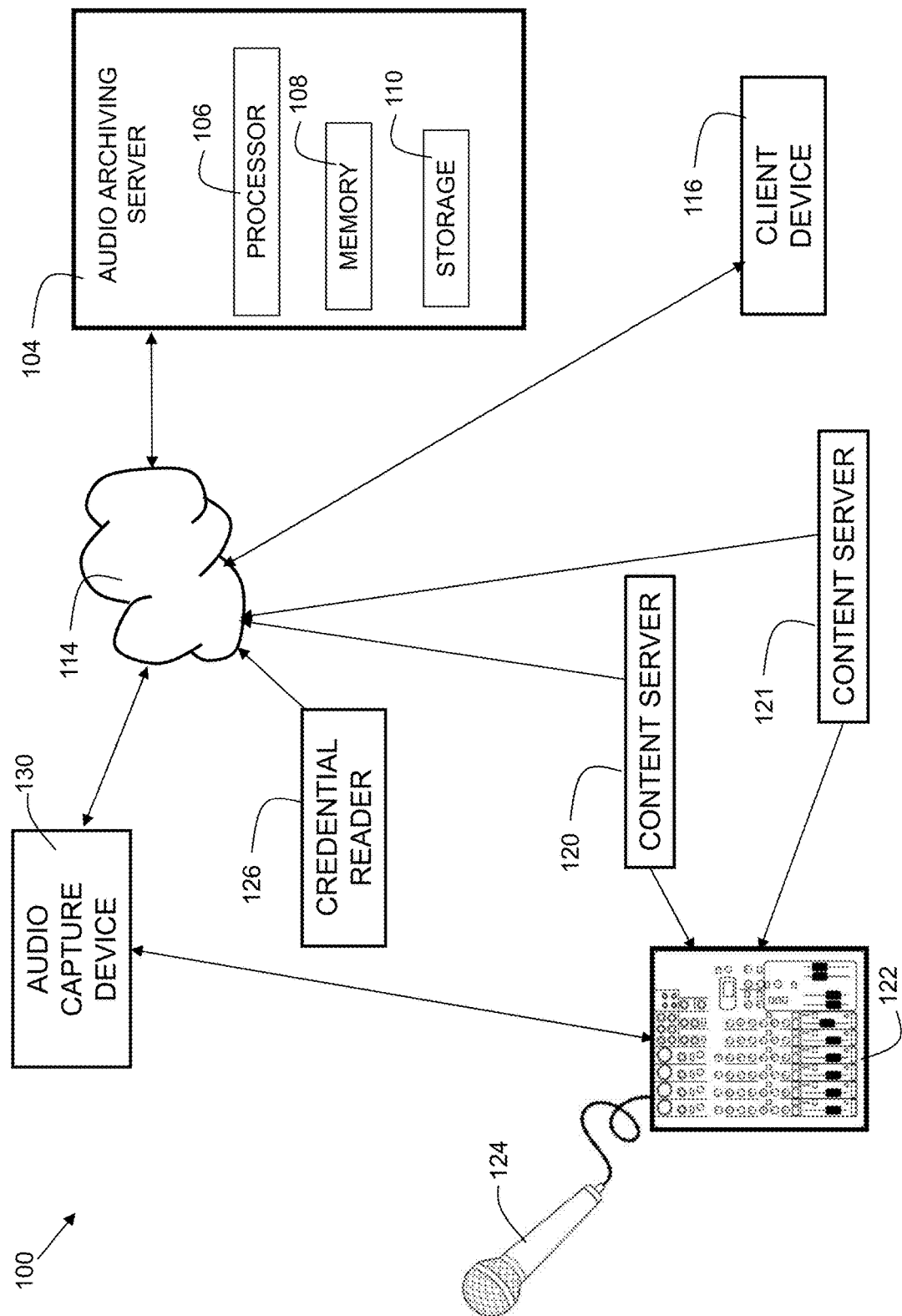
FIG. 1 shows a system in accordance with embodiments of the present invention.

FIG. 1 shows a system 100 in accordance with embodiments of the present invention. System 100 includes an audio archiving server 104. Audio archiving server 104 is an electronic device. In embodiments, the audio archiving server 104 is implemented as a computer comprising a processor 106, and memory 108 coupled to the processor. The memory 108 may be a non-transitory computer readable medium. Memory 108 may include RAM, ROM, flash, EEPROM, or other suitable storage technology. The memory 108 contains instructions, that when executed by processor 106, enable communication with a variety of other devices and data stores. In embodiments, network 114 may include the Internet.

Storage 110 may include one or more magnetic hard disk drives (HDD), solid state disk drives (SSD), optical storage devices, tape drives, and/or other suitable storage devices.

In embodiments, storage 110 may include multiple hard disk drives configured in a RAID (redundant array of independent disks) configuration. In embodiments, the RAID configuration can include a RAID 1 configuration in which data is copied seamlessly and simultaneously, from one disk to another, creating a replica, or mirror. If one hard disk drive becomes inoperable, another hard disk drive continues to operate, providing a level of fault tolerance.

In other embodiments, the RAID configuration can include a RAID 5 configuration in which data and parity are striped across three or more disks. If one hard disk drive within the array gets an error or starts to fail, data is recreated from this distributed data and parity block, seamlessly and automatically. This allows disclosed embodiments to remain operational even when one hard disk drive fails.

In yet other embodiments, the RAID configuration can include a RAID 6 configuration. This configuration is similar to the RAID 5 configuration, with the added enhancement of utilizing more parity blocks than RAID 5, allowing for more hard disk drives to fail while still remaining operational.

In yet other embodiments, the RAID configuration can include a RAID 10 configuration. RAID 10 is a combination of RAID 1 and 0 and is often denoted as RAID 1+0. It combines the mirroring of RAID 1 with the striping of RAID 0, thereby achieving a higher level of performance. Other redundancy schemes are possible with disclosed embodiments.

In yet other embodiments, the audio archiving server 104 may be implemented as a virtual machine (VM). In some embodiments, the virtual machine may be hosted in a cloud computing environment.

A client device 116 is also connected to network 114. In embodiments, client device 116 may include, but is not limited to, a desktop computer, a laptop computer, a tablet computer, a mobile phone (e.g. smartphone), and/or other suitable electronic computing device. Note that while one client device 116 is shown in FIG. 1, in practice, multiple client devices may concurrently establish connections with audio archiving server 104 in accordance with embodiments of the present invention.

The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (web). The physical connections of the Internet and the protocols and communication procedures of the Internet are well known to those of skill in the art. Access to the Internet can be provided by Internet service providers (ISP). Users on client systems, such as client 116 obtains access to the Internet through the Internet service providers. Access to the Internet allows users of the client computer systems to exchange information, receive and send e-mails, and view documents, such as documents which have been prepared in the HTML format. These documents are often provided by web servers which are considered to be "on" the Internet. Often these web servers are provided by the ISPs, although a computer system can be set up and connected to the Internet without that system being also an ISP as is well known in the art.

System 100 may further include one or more content servers, indicated as references 120 and 121. Note that while two content servers are shown in FIG. 1, in practice, more or fewer content servers may be present. The content servers are devices that may be configured to provide audio data to broadcast console 122. The content servers may further be configured to communicate metadata information to audio archiving server 104 via network 114. In some embodiments, the content servers may transmit metadata information to the audio capture device 130, which then transmits that metadata information to the audio archiving server 104. The metadata information can include, but is not limited to, content descriptor type, title, artist, album, duration, genre, time-of-day, and/or other suitable metadata types. Note, within this disclosure, "content descriptor type" refers to a category (e.g. voiceover, commercial, etc.) and "instance of a content descriptor type" refers to a particular media item of a given content descriptor type (e.g. a particular voiceover spot, or a particular commercial).

System 100 may further include a microphone 124. In embodiments, microphone 124 is coupled to broadcast console 122. Note that while one microphone 124 is shown in FIG. 1, in practice, multiple microphones may be used. Each time a microphone is engaged (e.g. unmuted), a "tally on" event is generated by broadcast console 122. Similarly, each time a microphone is disengaged (e.g. muted), a "tally off" event is generated by broadcast console 122.

Broadcast console 122 is configured to provide audio data and corresponding tally on and tally off data to audio capture device 130. Audio capture device 130 may process incoming audio signals. The processing can include digitizing, compressing, and/or encrypting the incoming audio signals. The processed audio signals, along with corresponding tally on and tally off event information, is sent to audio archiving server 104 via network 114. Thus, embodiments include receiving an audio signal; compressing the audio signal; creating a plurality of audio files, wherein each audio file comprises a portion of the compressed audio signal; associating a time of day with each audio file; and transmitting each audio file to a server.

System 100 may further include a credential reader 126. The credential reader 126 may include an electronically activated access for a broadcast booth or other room on the premises of the radio station. In embodiments, the credential reader 126 is configured to send access information to audio archiving server 104 via audio capture device 130 and network 114. In other embodiments, the credential reader 126 sends this information to the audio archiving server 104 directly via network 114, bypassing the audio capture device 130. The access information can include, but is not limited to, a person's name, employee identification number, and/or time-of-day of entry into the room, exit from the room, and/or authenticating with a computer information system. This serves to provide an additional level of accuracy as to the radio station personnel responsible for a given media item, such as a voice over. As an example, suppose that Andy was scheduled to work a given shift at a radio station, but needs to cancel at the last minute. Bob then comes to work to substitute for Andy. Bob uses his credentials (e.g. access badge, login information, etc.) to access the room and/or broadcast console 122. Bob's login and/or access information is transmitted to the audio archiving server, and associated with media items (e.g. voiceovers, songs, etc.) that the radio station output during the time that Bob was in the broadcast room. In this way, even though previous schedule data may indicate that Andy was responsible for this content, disclosed embodiments adapt to dynamic changes in schedule, and can properly indicate that Bob was responsible for the given content. This provides an unprecedented level of accuracy for determining personnel responsible for output of a radio station at a given time. In some cases, it may be that nobody is currently logged in. In this case, disclosed embodiments may indicate an "unknown" state for the name of the broadcaster.

In embodiments, server 104 provides a plurality of APIs for implementation of the various disclosed embodiments. In embodiments, the audio capture device 130 sends chunks of audio in fixed duration audio files to the audio archiving server, and associates each chunk with a real-time. The metadata source, which may or may not be the same physical device as the audio capture device 130, associates the media item with a real-time. The chunks with real-time and media items with real-time are uploaded to the audio archiving server 104. The audio archiving server thus creates an association with each audio file, and its corresponding real-time information, as well as which content descriptor type(s) and/or media item(s) belong to that audio file. It is possible to have multiple content descriptor types belonging to a single audio file. For example, when a disc jockey is speaking over the beginning of a song, an audio file capturing that point in time can have content descriptor types of both voiceover and song. Similarly, it is possible to have multiple media items belonging to a single audio file.

The server can provide an application programming interface (API) that the client can use to get a manifest file that lists chunks. The first API takes as its input a start time and a duration. The second API takes as its input a metadata ID. If the client uses the API that takes in a metadata ID, the server looks up the start time and duration for the media item with the matching ID. In either case, the server responds with a manifest listing chunks whose time overlaps with the range given by the start time and duration of the request.

A variety of manifest protocols may be used for the purpose of managing and transferring audio chunks. In embodiments, MPEG DASH (Dynamic Adaptive Streaming over HTTP) is used to manage the manifest exchanges between the client and the audio archiving server.

In MPEG-DASH, a presentation is represented by a Media Presentation Descriptor (MPD). MPDs can be static or dynamic, representing on-demand or live content, or both. A playback API implemented in the audio archiving server prescribes that every media item identified by a metadata ID has a corresponding MPD. In discrete playback mode, this MPD lists all of the media segment files necessary to play the entry. Because an entry can be created with an approximate duration before it has been recorded, the MPDs associated with such entries are dynamic, and will change as content is recorded and becomes available.

The playback API further prescribes an additional MPD named "continuous.mpd." This dynamically generated MPD takes a start and end time as a parameter. The MPD lists all of the media segment files necessary to play from the start until the end time. If the start time is before the first available segment or the end time is after the last available segment, the returned MPD only contains available segments. This MPD is dynamic, and changes as content is recorded and becomes available.

Embodiments further include a CODEC API. The CODEC API is an RTP endpoint, available to radio stations through both an IPv4 address or IPv6 address, and a fully qualified domain name. In embodiments, the RTP endpoint supports at least the AAC and MP3 CODECs.

Embodiments further include a metadata API. The metadata API allows software at the radio station site to specify the descriptive content of the audio stream as media items, thereby populating the list of media items 402. Multiple sources at the radio station site can simultaneously provide metadata, for example one source providing information derived from a radio automation system, and another source providing information derived from a studio microphone tally signal.

Media items can be updated. If an entry's duration is unknown, an estimate can be initially provided to the metadata API. When the estimate changes or the duration becomes known, the media item information is updated. Because a media item identified by a metadata ID is immutable, updating a media item causes a new metadata ID to be used for the updated media item.

Figure 2:
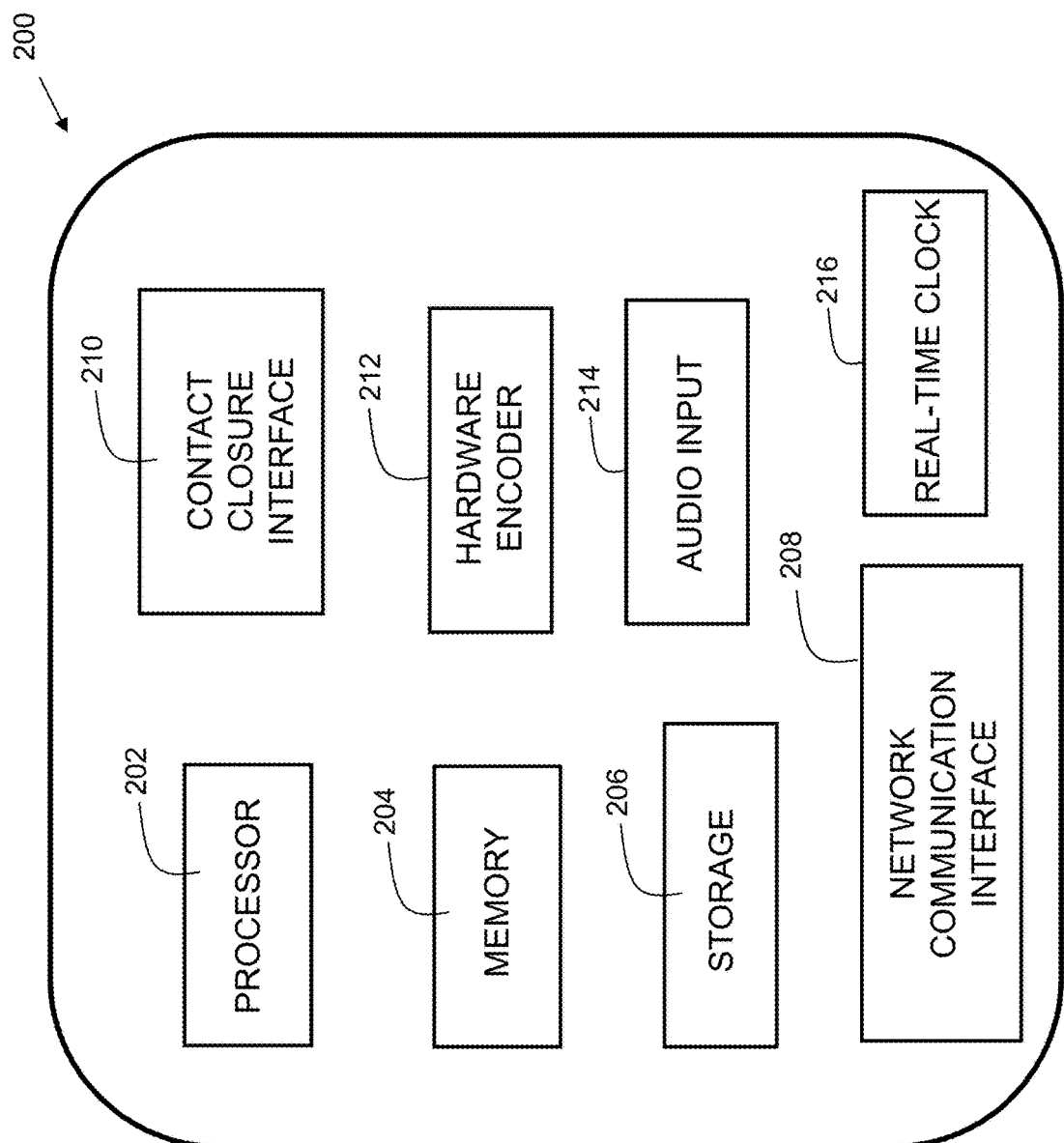
FIG. 2 shows a block diagram of an audio capture device in accordance with embodiments of the present invention.

FIG. 2 shows a block diagram of an audio capture device 200 in accordance with embodiments of the present invention. Audio capture device 200 is an electronic device that includes a processor 202, a memory 204 coupled to the processer 202, and storage 206. The memory 204 may be a non-transitory computer readable medium. Memory 204 may include RAM, ROM, flash, EEPROM, or other suitable storage technology. The memory 204 contains instructions, that when executed by processor 202, enable communication to audio archiving server 104 of FIG. 1. Audio capture device 200 further includes a network communication interface 208 for performing this communication. In embodiments, network communication interface 208 includes a wireless communications interface such as a cellular data interface and/or a Wi-Fi interface. In embodiments, the storage 206 includes one or more hard disk drives (HDDs) and/or solid state disk drives (SDDs).

Audio capture device may further include a real-time clock 216. In embodiments, real-time clock (RTC) 216 may be used to associate captured audio with a time-of-day. Audio capture device 200 may further include audio input 214. In embodiments, audio input 214 may include an analog audio input. This can include a physical connector such as an XLR connector, RCA connector, phono jack, or other suitable analog audio connection. Audio input 214 may further include analog signal processing elements such as amplifiers, filters, and other signal conditioners to prepare the analog audio for encoding. Audio capture device 200 may further include a hardware-based encoder 212 to encode incoming analog audio signals. In embodiments, the encoder 212 may encode the analog audio into an MP3 format, AAC format, OGG format, FLAC format, or another suitable format. In embodiments, the encoding may be performed by processor 202, and the hardware encoder may not be present in some embodiments. In yet other embodiments, the input audio may be in a digitized format, in which case, the audio capture device may perform additional encoding, transcoding, or reencoding, or may pass through the input audio to the audio archiving server via the network communication interface 208. Note that in some embodiments, analog-to-digital converter might not be required if the audio capture device utilizes a digital input interface such as an AES3 or SPDIF audio interface instead of an analog audio interface.

Audio capture device 200 may further include a contact closure interface 210. The contact closure interface 210 may include circuitry to detect an applied voltage and/or current on a connected signal. In embodiments, the broadcast console (122 of FIG. 1) may utilize a contact closure interface to signify the tally on and tally off events to the audio capture device, which in turn provides that information to the audio archiving server 104. In other embodiments, the broadcast console 122 may send a network message direct to the audio capture device and/or to the audio archiving server 104 to indicate a tally event. In embodiments, the broadcast console interface comprises a contact closure interface. Furthermore, embodiments include a broadcast console interface, and the memory of the audio capture device comprises instructions, that when executed by the processor, perform the steps of: receiving a login event from a computing device; receiving a tally-on event from a broadcast console device; and associating the tally-on event with the login event. In some embodiments, the memory further comprises instructions, that when executed by the processor, perform the steps of: receiving a tally-off event from the broadcast console device; and associating the tally-off event with the tally-on event. The combination of login, tally-on, and tally-off is the information necessary for the audio capture device to create a media item with content descriptor (based on the person associated with the login), start time (based on the time of the tally-on event), and duration (based on the time of the tally-off event) which is transmitted to the audio archiving server.

In embodiments, the audio capture device 200 may provide metadata (e.g. tally on, tally off, and/or user login information) to the audio archiving server 104 via network 114 using one or more protocols, including, but not limited to, HTTP, XML, and/or JSON. This mechanism may be used in place of the contact closure interface in some embodiments.

Embodiments of the present invention may utilize a JavaScript Object Notation (JSON) web service to make a JSON call to the audio archiving sever. In some examples, the JSON call is made using XML HTTP, which implements an XML HTTP object that has functionality enabling the exchange of Extensible Markup Language (XML) data directly over the Internet using the Hypertext Transfer Protocol (HTTP). The XML HTTP object allows access of the audio archiving sever data from a server, parsing the data using an XML Document Object Model (DOM), and posting XML data through a standard firewall directly to an HTTP server. Thus, the audio capture device may provide both audio data, and metadata associated with that audio data, to the audio archiving server 104. The format of the data may include an audio data file and a header and/or footer that includes one or more metadata items and/or a reference to other metadata items. In other embodiments, the data format may be implemented as additional data encoded in the audio files in a way that is conceptually similar to a header and/or footer (extra MP4 atom, for example). In yet other embodiments, the audio capture device uploads audio segments as files (using the AAC codec and MP4 container format) and metadata as separate files (containing JSON, and either constructed from information received from content servers, or derived from the login/tally-on/tally-off events).

Figure 3:
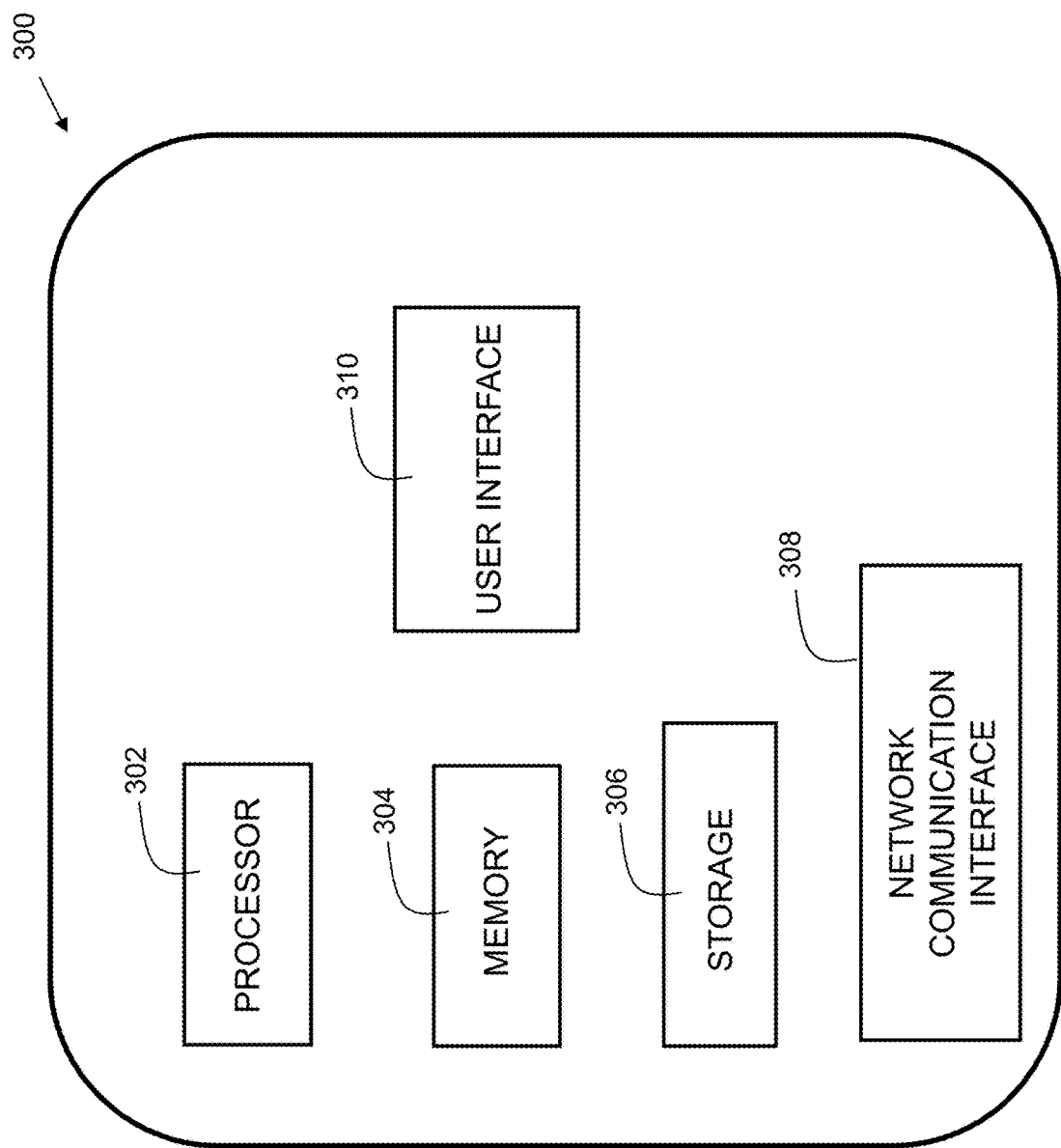
FIG. 3 shows a block diagram of a client device in accordance with embodiments of the present invention.

FIG. 3 shows a block diagram of a client device 300 in accordance with embodiments of the present invention. In embodiments, client device 300 is an electronic device that may include a desktop computer, laptop computer, tablet computer, smartphone, and/or other suitable client device. Client device 300 may be similar to client device 116 as shown in FIG. 1. Client device 300 includes a processor 302, a memory 304 coupled to the processer 302, and storage 306. The memory 304 may be a non-transitory computer readable medium. Memory 304 may include RAM, ROM, flash, EEPROM, or other suitable storage technology. The memory 304 contains instructions, that when executed by processor 302, enable communication to/from audio archiving server 104 of FIG. 1. Audio capture device 300 further includes a network communication interface 308 for performing this communication. In embodiments, network communication interface 308 includes a wireless communications interface such as a cellular data interface and/or a Wi-Fi interface. In embodiments, the storage 306 includes one or more hard disk drives (HDDs) and/or solid state disk drives (SDDs).

Device 300 may further include a user interface 310. User interface 310 may include a keyboard, monitor, mouse, and/or touchscreen, and provides a user with the ability to enter information as necessary to utilize embodiments of the present invention. In embodiments, a user uses the device 300 to access content archived by the audio archiving server 104 based on criteria specified by the user. The user may specify the criteria via device 300. The device 300 may then transmit the criteria as a query to the audio archiving server 104. In response, the audio archiving server 104 provides one or more audio files and associated metadata to the client device 300.

Figure 4:
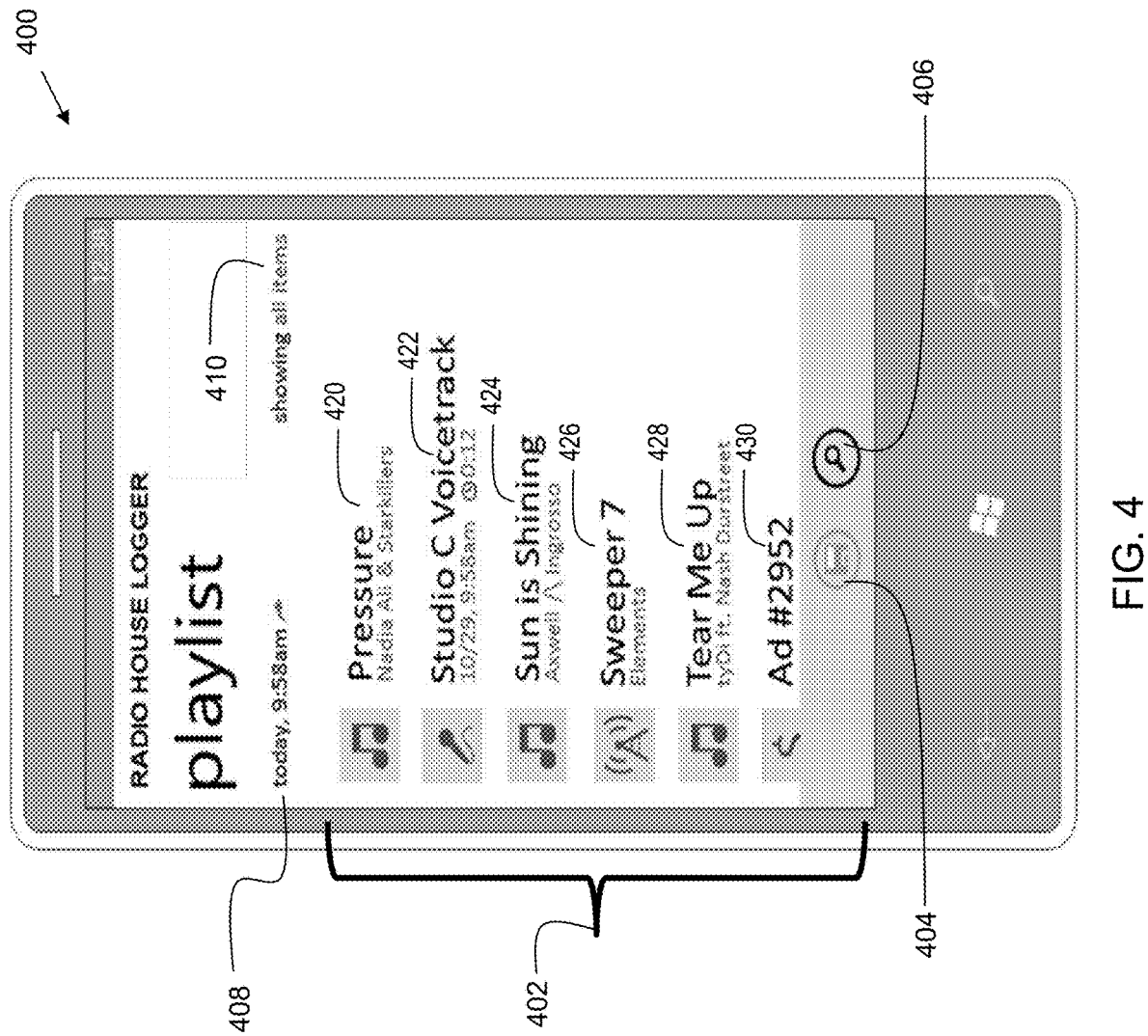
FIG. 4 shows an exemplary client device user interface indicating media items.

FIG. 4 shows an exemplary client device user interface 400 indicating media items. The user interface 400 of the client device can display a chronologically ordered list of media items 402. As shown in FIG. 4, a variety of media items corresponding to different content descriptor types are displayed. Media item 420 is a song. Media item 422 is a voiceover track. Media item 424 is a song. Media item 426 is an announcement. Media item 428 is a song. Media item 430 is an advertisement. Other content descriptor types are possible in embodiments of the present invention.

The user can manipulate a user interface control to filter the displayed list based on the fields of the displayed media items. Specifying a time/date in time field 408 allows a user to select a specific real-time to cause the list to display media items at nearby that real-time. The user interface enables manipulation of the list to scroll backwards and forwards through the list of displayed media items.

Filter list control 410 allows a selection of media item types to be displayed. As shown, all item types are displayed. However, if the user selects a specific content descriptor type, then only media items of that content descriptor type are displayed. For example, if the user selects "voiceover" then the list 402 only shows voiceover media items (e.g. such as item 422). This has utility in situations where a radio station manager wishes to review the performance of a disc jockey. Using disclosed embodiments, the manager can quickly listen to the portions of a radio broadcast where the disc jockey is speaking, skipping over the songs. Furthermore, by utilizing login and/or credential reader information, increased accuracy in identifying the correct disc jockey that is doing the speaking is achieved. In some embodiments, the disc jockey, announcer, or other radio station personnel may also be represented as a content descriptor type.

Save button 404 allows a user to save audio at the real-time of a selected media item. In embodiments, the saved audio may be exported in the form of a digital compressed audio file such as an MP3 file. The saved audio may be stored in a cloud storage, where it can be streamed and/or downloaded at a future time.

Search query control 406 allows a user to enter a free text search query to search for media items. As an example, a song title can be entered to identify instances of when that song was played. The user then has the ability to identify media items played in proximity to that song, such as the voiceover at the start and/or finish of the song, and/or advertisements preceding or following the song.

The user can manipulate a displayed media item to cause the client to play back or save the portion of the real-time audio stream of the real-time bounds of that media item. Disclosed embodiments provide multiple playback modes. In continuous mode, playback proceeds continuously through time without seeking based on metadata, allowing a user to hear media items played in sequence, as they were originally broadcast. Thus, in continuous mode, the user hears what the radio listeners heard during the original broadcast. The currently playing media item(s) are indicated on the user interface. Embodiments can include receiving a playback mode request for a continuous playback mode; receiving a start time associated with the continuous playback mode; receiving an audio stream comprised of one or more of the plurality of audio data files, where at least one of the one or more of the plurality of audio data files includes a time-of-day range that begins with, or spans the received start time.

A discrete mode plays items associated with a specific content descriptor type. For example, if the specified content descriptor type is "advertisement" then the discrete mode plays an advertisement, and then plays the following advertisement, which may or may not be contiguous from a real-time perspective. For example, during a commercial break, multiple advertisements may be played consecutively. Then, a song or other program broadcast may occur, followed by more advertisements at the next commercial break. In discrete mode, with the specified content descriptor type as advertisement, playback skips over songs and/or program broadcasts to the next aired advertisements (commercials). In some embodiments, the discrete mode may be implemented such that a user can specify multiple content descriptor types to play. This can include selecting multiple content descriptor types from a list, and/or playing media items of all content descriptor types that match a search query. An example use case can include a scenario where a user wishes to review both voiceovers and commercials that occurred during a radio broadcast. In this case, two content descriptor types (voiceover, and commercial) are selected, causing media items of only those two types to be played.

Within discrete mode, there are two sub modes, manual, and automatic. In manual mode, the playback stops at the end of each media item. In automatic mode, the playback continues to the next media item of the designated content descriptor type (e.g. advertisement). Embodiments can include receiving a playback mode request for a discrete playback mode; receiving a content descriptor associated with the discrete playback mode; identifying a first subset of the plurality of audio files corresponding to a first instance of the content descriptor (first media item); identifying a second subset of the plurality of audio files corresponding to a second instance of the content descriptor (second media item); receiving an audio stream comprised of the first subset of audio files followed by the second subset of audio files.

The user can manipulate a user interface control to select a range of media items in a list to play back or save in discrete mode, or continuous mode. When a range of media items is saved to a file in discrete or continuous mode, a single audio file is created whose contents consist of an encoded signal describing the results of applying the following playback mechanisms to the original real-time audio stream. When a range of media items is played back in discrete mode, the user can manipulate a user interface control to playback the audio content in automatic or manual mode.

When playing back or saving a list of media items in automatic discrete mode, the client selects a media item in the list as the current media item. The client begins audio playback at the beginning real-time bound of the current media item. The client continues audio playback until the ending real-time bound of the current media item. The client then selects the next media item in the list as the current media item. The client repeats the above algorithm until the client finishes playback of the last media item in the list, at which time playback stops.

When playing back a list of media items in manual mode, the client performs the same process as above in automatic discrete mode, with one modification. When the client reaches the ending real-time bound of the current media item, the client stops playback and waits for the user to manipulate a user interface control to restart playback on the same or next media item in the list. Embodiments can include pausing the reception of the audio stream after playback of the first subset of audio files; and responsive to receiving a user request, resuming the receiving of the audio stream for the second subset of audio files.

When playing back or saving a list of media items in continuous mode, the client begins audio playback at either the beginning real-time bound of the first media item in the list, or the beginning real-time bound of the media item in the list whose beginning real-time bound is earlier than all others. The client continues audio playback until either the ending real-time bound of the last media item in the list, or the ending real-time bound of the media item in the list whose ending real-time bound is later than all others.

While the client is playing in continuous mode, zero, one, or more media items can correspond to the current playback position by having real-time bounds overlapping the current playback position. If zero media items correspond to the current playback position, the client can choose to play from the current position, even though no media item is specified (this could be a case of silence (e.g. "dead air") or audio of an unclassified media type. If one media item corresponds to the current playback position, it is the current media item. If multiple media items correspond to the current playback position, one selected by the client is the current media item. As playback continues and the current playback position changes, the client recalculates the current media item. In some embodiments, the client can display the metadata of a nearby item (previous or next item) or can display placeholder information on its user interface to represent that no media item corresponds to the current playback position.

When playing back in any mode, if there is a current media item, the client displays the metadata fields of the current media item, and a progress indicator displaying the current playback position relative to the bounds of the current media item. The user can manipulate the progress indicator to cause playback to seek to a point in time within the real-time bounds of the current media item. The user can manipulate a user interface element to cause the media item directly before or after the current media item to become the current media item, at which time playback seeks to the beginning real-time bound of the new current media item.

Figure 5:
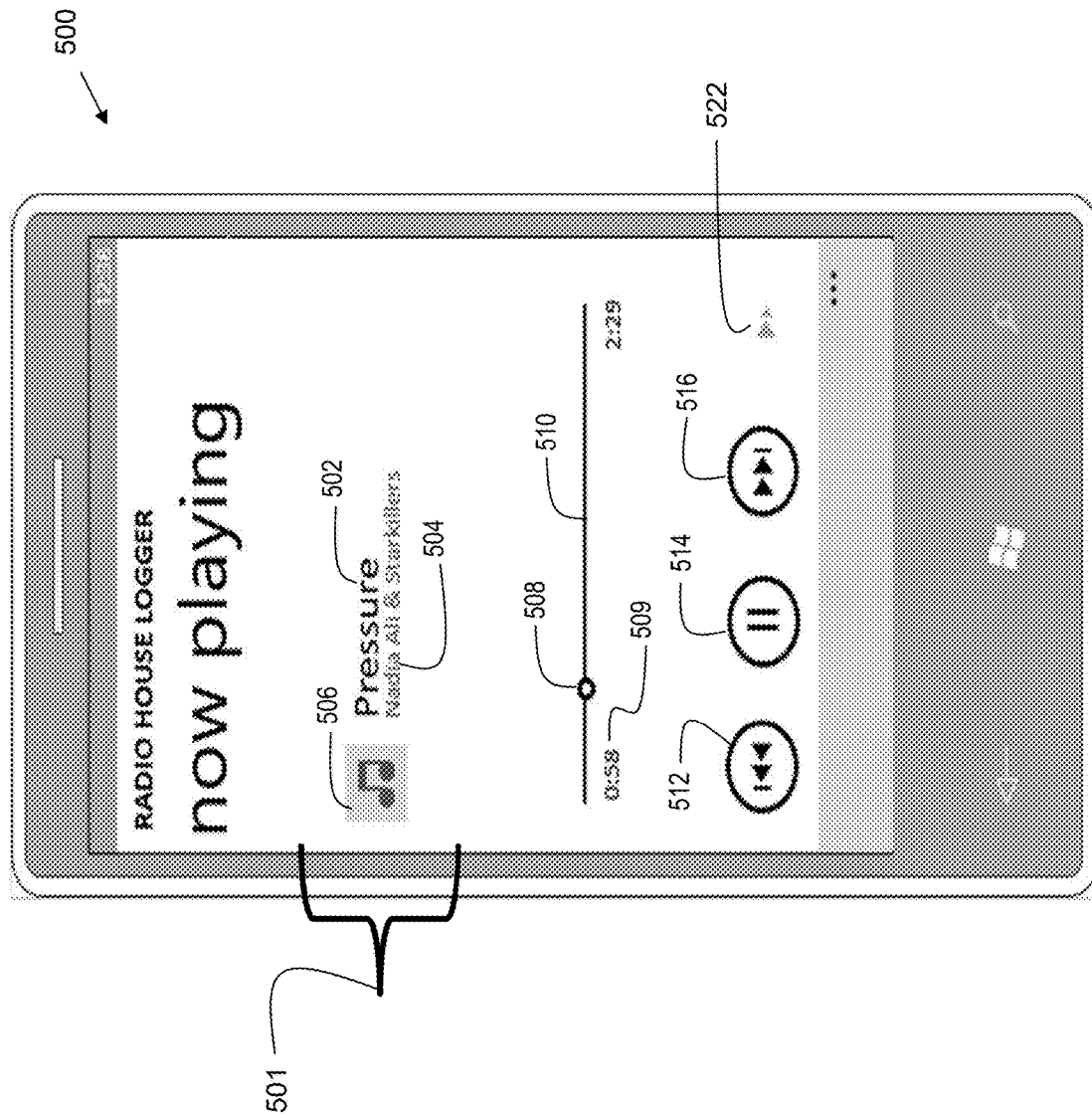
FIG. 5 shows an exemplary client device user interface indicating playing of a media item.

FIG. 5 shows an exemplary client device user interface 500 indicating playing of a media item. Media item 501 has various metadata fields associated with it. Metadata field 502 is a title. Metadata field 504 is an artist. Metadata field 506 is a graphic image. In embodiments, if no graphic image is available, a default graphic image may be used. In embodiments, the graphic image may be the album art associated with the title 502 and or a corresponding album. In embodiments, the graphic image is retrieved from an online album art database (e.g. CDDB, Gracenote, etc.). Different content descriptor types can have different graphic images. Embodiments can include rendering a first graphical element corresponding to the first content descriptor; and rendering a second graphical element corresponding to the second content descriptor.

Timeline 510 shows a temporal display of the currently playing media item. Current position indicator 508 indicates the current position within the media item. In embodiments, indicator 508 may also be a selectable control that allows the user to seek to a time within the real-time bounds of the current media item. Current position numeric field 509 indicates a numerical value of the current playback position within the media item. Playback control 514 allows for pausing and/or resuming playback of the current media item. Control 512 sets the previous media item as the current media item. Similarly, control 516 sets the next media item as the current media item. Control 522 cycles through the various playback modes (continuous, discrete automatic, and discrete manual).

Figure 6:
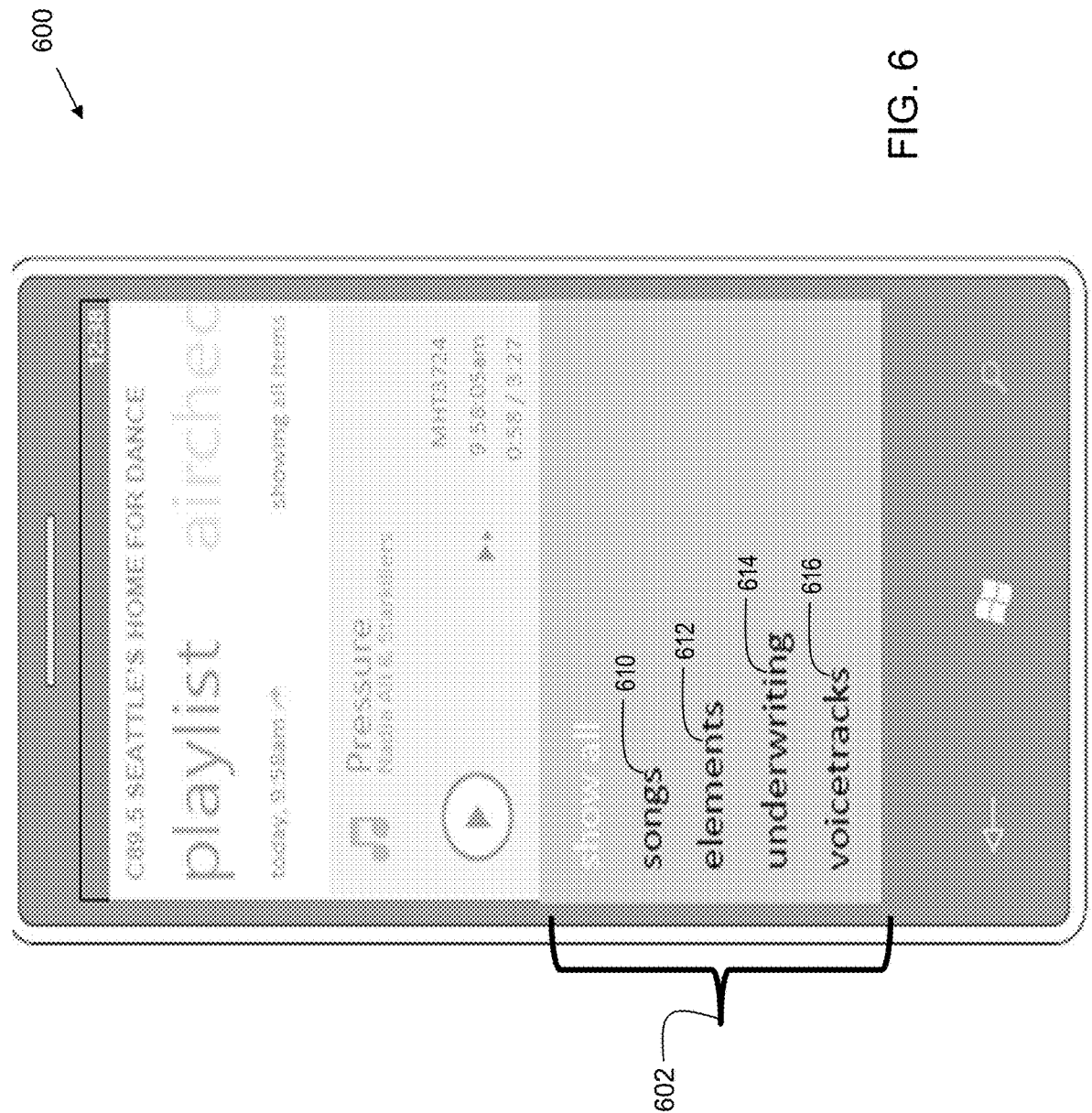
FIG. 6 shows an exemplary client device user interface indicating a list of selectable content descriptor types.

FIG. 6 shows an exemplary client device user interface 600 indicating a list 602 of selectable content descriptor types. These content descriptor types can be used for filtering and use with the discrete playback modes. In FIG. 6, four content descriptor types are shown, including songs 610, elements 612, underwriting 614, and voicetracks 616. These content descriptor types are merely exemplary, and other content descriptor types are possible in embodiments of the present invention. In embodiments, a content descriptor type of "name" may be used. The "name" content descriptor type can be used to refer to radio station personnel such as disc jockeys and/or announcers. In this way, a discrete playback mode can be used to find all media items pertaining to a particular person at the radio station. Thus, embodiments include sending a query comprising a content descriptor type of "name." This allows a user to retrieve media items associated with particular radio station personnel (e.g. all voiceovers from "John Smith").

Figure 7:
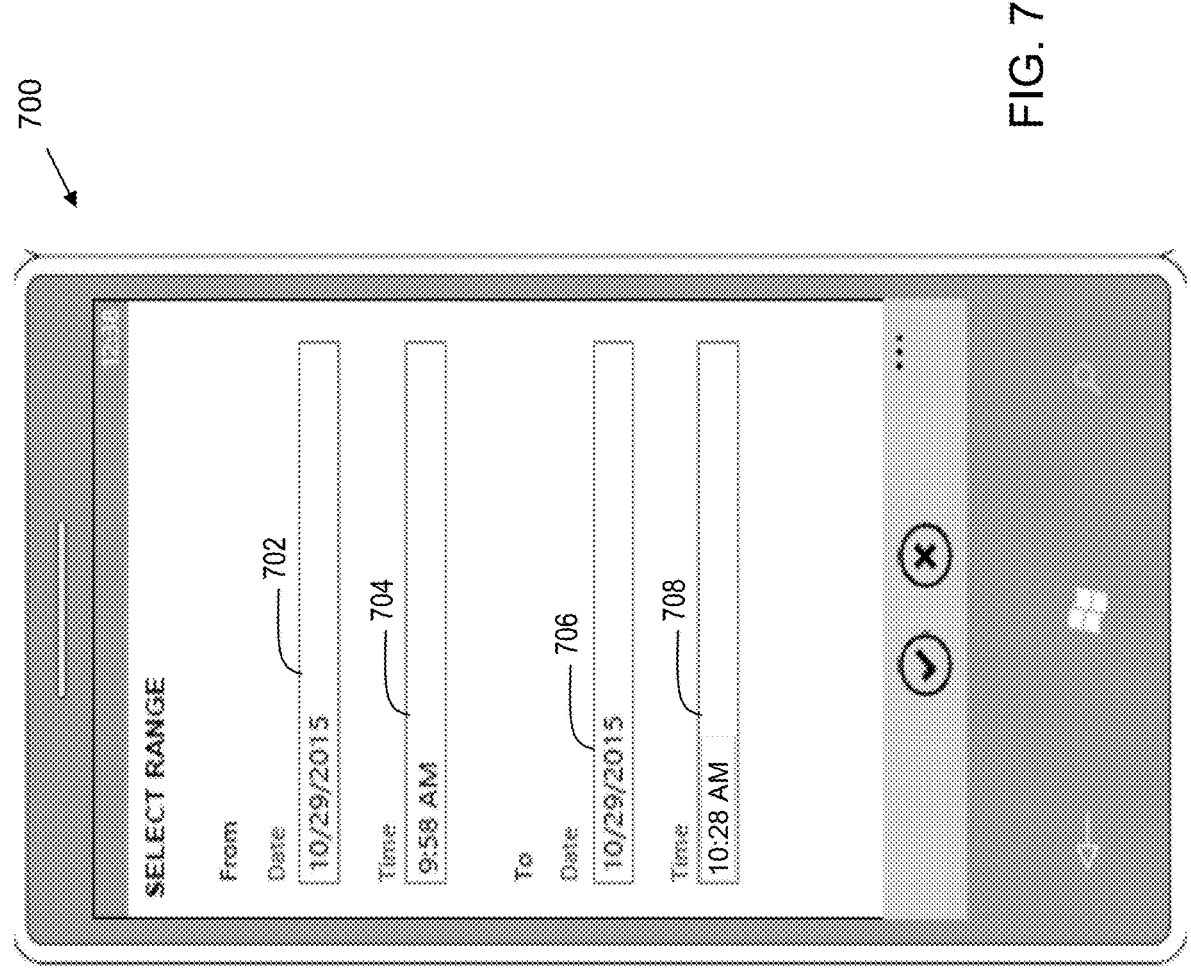
FIG. 7 shows an exemplary client device user interface for selecting a time range for searching.

FIG. 7 shows an exemplary client device user interface 700 for selecting a time range for searching. Field 702 is configured to receive a starting date. Field 704 is configured to receive a starting time. Field 706 is configured to receive an ending date. Field 708 is configured to receive an ending time. In embodiments, a list of media items falling within the rage specified by fields 702—708 is retrieved and displayed in list form on the client device, as shown in FIG. 4.

Figure 8:
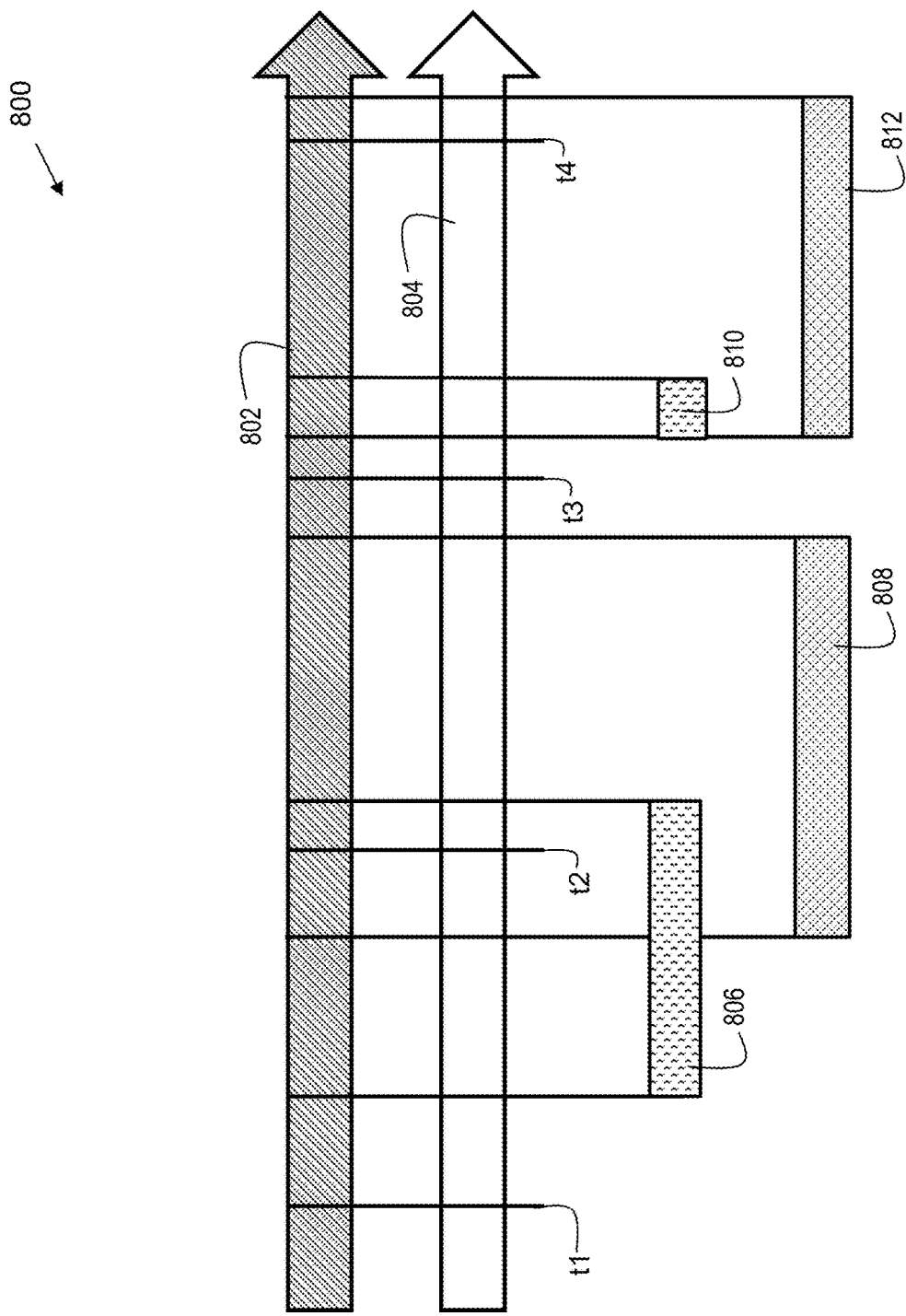
FIG. 8 shows an exemplary temporal relationship of content items.

FIG. 8 is a graph 800 showing an exemplary temporal relationship of content items. Arrow 802 represents real-time, and arrow 804 represents audio. Four media items are shown, indicated as 806, 808, 810, and 812. Four points in time are illustrated in graph 800, indicated as t1, t2, t3, and t4. As can be seen in graph 800, some points may correspond to a single media item, such as point t4, which occurs during media item 812. Some points may correspond to multiple media items, such as point t2, which occurs during media item 806 and media item 808. Some points may correspond to zero media items, such as point t3. To illustrate operation of various modes of disclosed embodiments, the following is assumed, for the sake of example:

Media item 806—voiceover
Media item 808—song
Media item 810—voiceover
Media item 812—song Examples of playback modes are now described based on the aforementioned conditions. With a continuous playback mode, starting at media item 806, the voiceover is played, and playback continues to item 808, where both items are played until completion of item 806, at which time the playback of item 808 continues. The playback continues linearly such that the output is similar to what was originally broadcast. In embodiments, the start of a voiceover track is defined by a tally on event, and the end of a voiceover track is defined by a tally off event.

In discrete mode, the playback is based on the selected content descriptor type, as well as the sub mode selected. As an example, if the selected content descriptor type is voiceover, then the discrete mode may start by playing item 806. After playback of item 806 is completed, the next item to be played back is item 810. If the sub mode is manual, the playback stops after item 806, until the user manually indexes to item 810 (e.g. by pressing control 516 of FIG. 5). If the sub mode is automatic, then the playback automatically continues to play item 810 upon completion of playback of item 806. Similarly, if in discrete mode, and currently playing item 810, and the control 512 is invoked, the playback goes to item 806 (the previous media item of that content descriptor type). Thus, embodiments include displaying a list of content descriptor types; receiving a selection of a first content descriptor type from the list of content descriptor types; playing audio corresponding to the first content descriptor type and having a first time-of-day start time; rendering an indication of the first content descriptor type on the electronic display; responsive to a seek back event, playing audio corresponding to a second content descriptor type, wherein the audio corresponding to the second content descriptor type has a second time-of-day start time; and rendering an indication of the second content descriptor type on the electronic display. Furthermore, embodiments include displaying a list of media items; receiving a selection of a first media item from the list of media items; playing audio corresponding to the first media item and having a first time-of-day start time; rendering an indication of the first media item on the electronic display; responsive to a seek back event, playing audio corresponding to a second media item, wherein the audio corresponding to the second media item has a second time-of-day start time; and rendering an indication of the second media item on the electronic display In continuous mode, the playback is continuous through time, regardless of the presence of a media item. As an example, if continuous mode playback is started at time t2, it continues through t3 while no media items are associated with the audio, and then on to item 810 and item 812, providing an audio output similar to what a listener heard at during the original broadcast.

In embodiments, the media items may be discrete isolated tracks. In other embodiments, the media items may be mixdown tracks. In the case of mixdown tracks, the entire radio broadcast is heard on each media item. For example, with mixdown tracks, when selecting item 810 for playback, audio from both the voiceover of media item 810 and the beginning portion of the song corresponding to media item 812 is heard. Thus, embodiments include rendering a first time-of-day start time and a second time-of-day start time, where the first time-of-day start time is identical to the second time-of-day start time. With isolated tracks, when selecting item 810 for playback, only the voiceover track is heard, and the beginning portion of the song corresponding to media item 812 is not heard. Disclosed embodiments can work with both discrete isolated tracks and/or mixdown tracks. Embodiments can include playing audio corresponding to a first instance of a content descriptor type and having a first time-of-day start time; rendering an indication of the first instance on the electronic display; responsive to a seek event, playing audio corresponding to a second instance of the content descriptor type, wherein the audio corresponding to the second instance has a second time-of-day start time; and rendering an indication of the second instance on the electronic display. Put another way, embodiments can include playing audio corresponding to a first media item and having a first time-of-day start time; rendering an indication of the first media item on the electronic display; responsive to a seek event, playing audio corresponding to a second media item, wherein the audio corresponding to the second media item has a second time-of-day start time; and rendering an indication of the second media item on the electronic display. An example use case can include a scenario where a user wishes to review commercials that occurred during a radio broadcast. In this case, a single content descriptor type (commercial) is selected, causing media items of only that type to be played.

Figure 9:
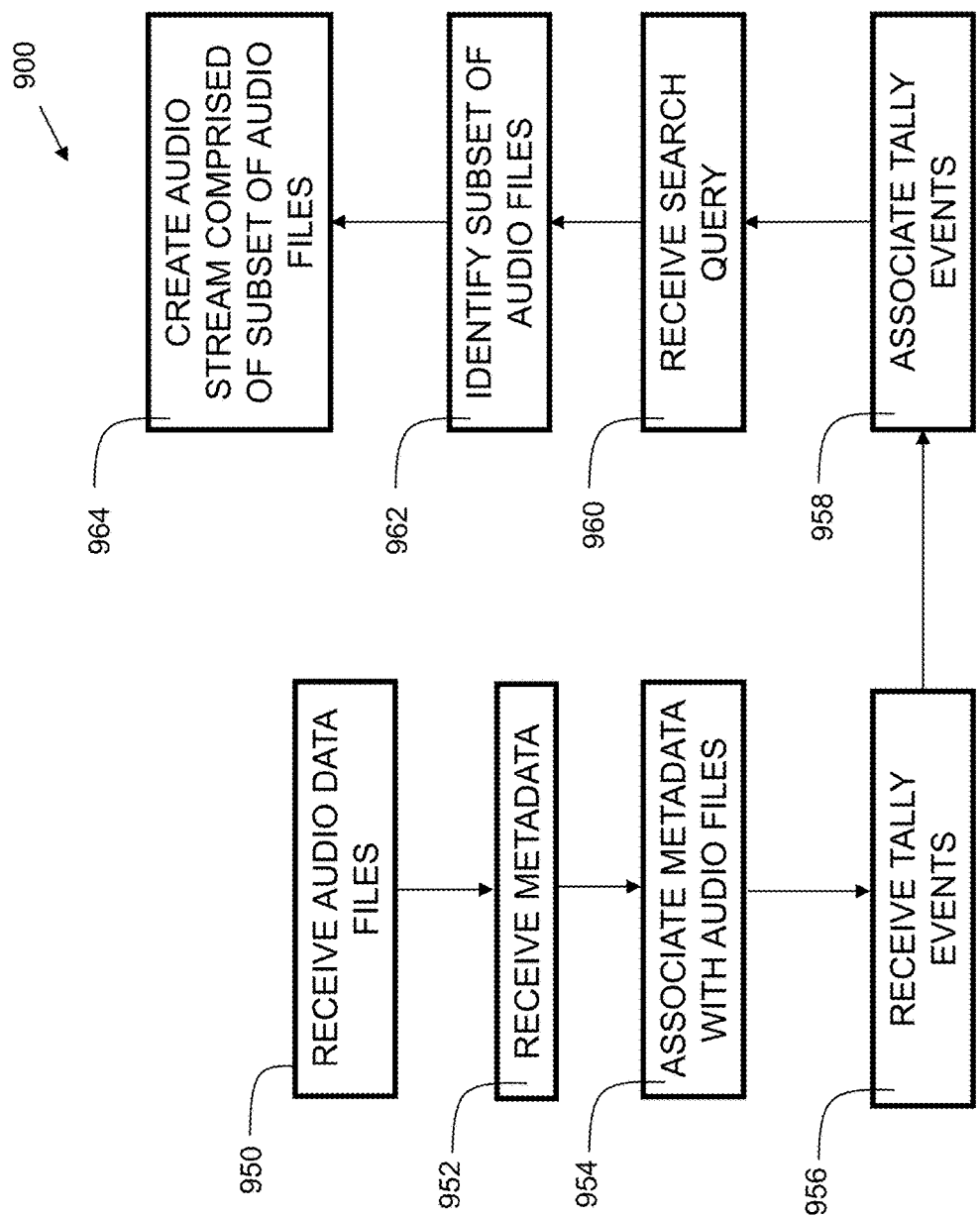
FIG. 9 is a flowchart indicating process steps for embodiments of the present invention.

FIG. 9 is a flowchart 900 indicating process steps for embodiments of the present invention. In process step 950, a plurality of audio files is received. In embodiments, each audio file is of a fixed duration (e.g. two seconds), corresponding to a portion of a radio broadcast. In process step 952, metadata is received. In process step 954, metadata is associated with audio files. In process step 956 tally events are received. These events correspond to muting and unmuting of a microphone coupled to a broadcast console. In process step 958, the tally events are associated with one or more audio files. In process step 960, a search query is received. In process step 962, a subset of audio files corresponding to the search criteria is identified. In process step 964, and audio stream is created that comprises the subset of audio files.

As an example, if a user specifies a particular media item, then audio files that correspond to that media item are identified. In the case where each audio file represents a two second duration of a radio broadcast, and a user wishes to play back a 30 second commercial, then the subset of audio files comprises 15 audio files, which, when played/streamed consecutively, render the audio of the 30 second commercial. Thus, embodiments include receiving a search query, wherein the search query includes a time of day; identifying one or more of the plurality of audio data files having associated metadata that matches the search query; and outputting an audio stream comprised of the one or more of the plurality of audio data files having associated metadata that matches the search query.

Figure 10:
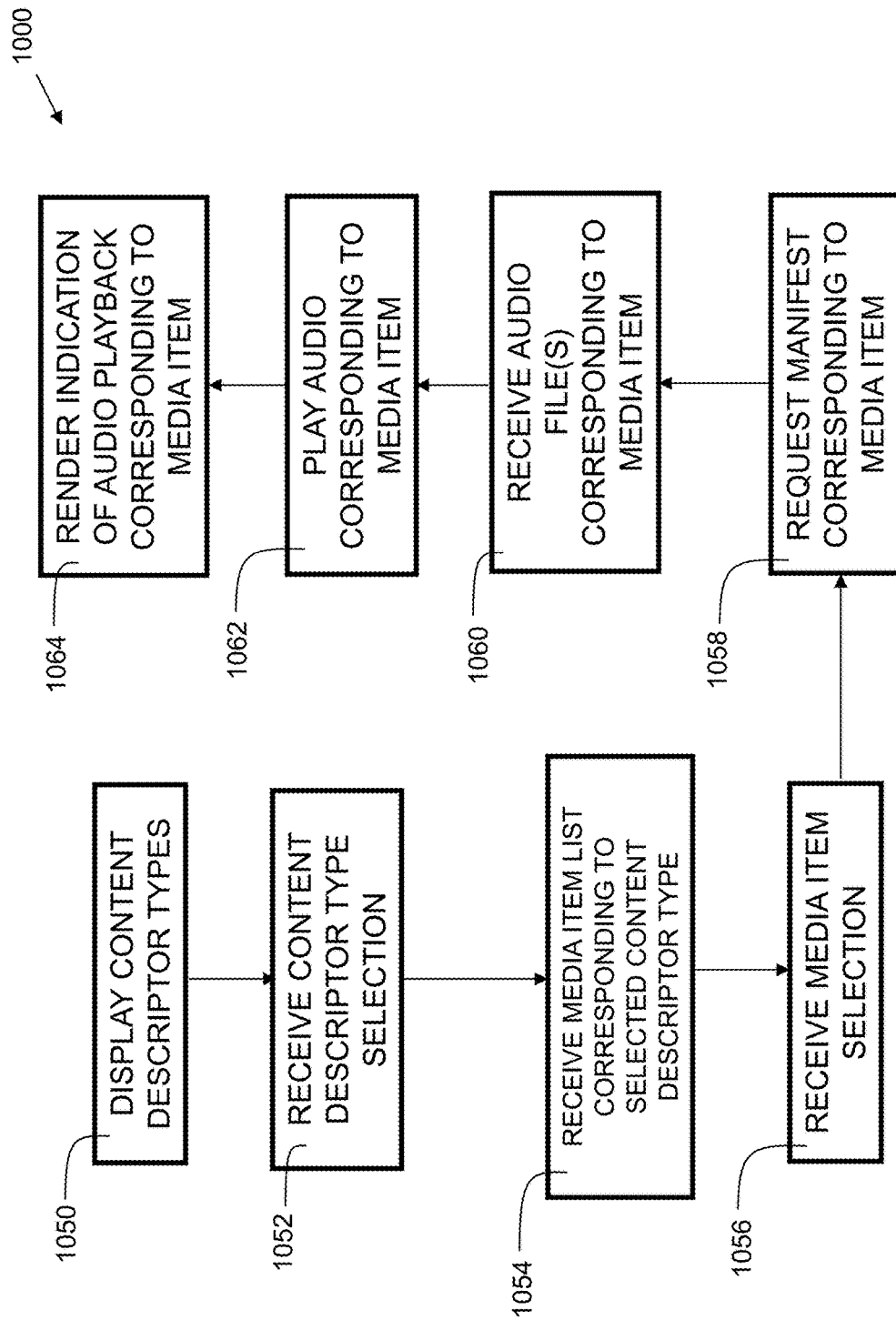
FIG. 10 is a flowchart indicating process steps for additional embodiments of the present invention.

FIG. 10 is a flowchart 1000 indicating process steps for additional embodiments of the present invention. In process step 1050, a list of content descriptor types is displayed.

In process step 1052, a content descriptor type is received from a user interface on a client device. In process step 1054, a media item list corresponding to the selected content descriptor type is received. In process step 1056, a media item section is received. In process step 1058, a manifest request is sent from the client to the audio archiving server. The manifest received as a response to the request contains the list of audio files that the client should request from the server in order to render the media item(s) desired by the user.

In process step 1060, the audio files corresponding to the manifest are received by the client, along with associated metadata. In process step 1062, the received audio is played. In process step 1064, an indication of the audio currently being played is rendered on the client device. The rendering can include presenting metadata field values, such as content descriptor type (song, voiceover, etc.), title, artist, album, and/or associated radio station personnel, among others. The rendering can also include a temporal indication of playback (e.g. 508, 509, and/or 510 of FIG. 5). In this way, radio station stakeholders can conveniently monitor radio station output with improved accuracy and efficiency. Thus, embodiments include sending a query to an audio server, wherein the query comprises a time of day, and one or more content descriptor types; sending a manifest request to the audio server for a specified time period; requesting a plurality of audio files from the audio server based on information received from the manifest request; and receiving the plurality of audio files from the audio server, wherein the plurality of audio files corresponds to at least one of the one or more content descriptor types. In some embodiments, a search query is sent to the audio archiving server. In embodiments, this includes sending a query comprising a content descriptor type selected from the group consisting of song, voiceover, and commercial. In some embodiments, the query can include sending a query comprising a keyword string. For example, a search for the keyword "toys" can return a list of media items with the word "toys" in the title or other metadata field.

Figure 11:
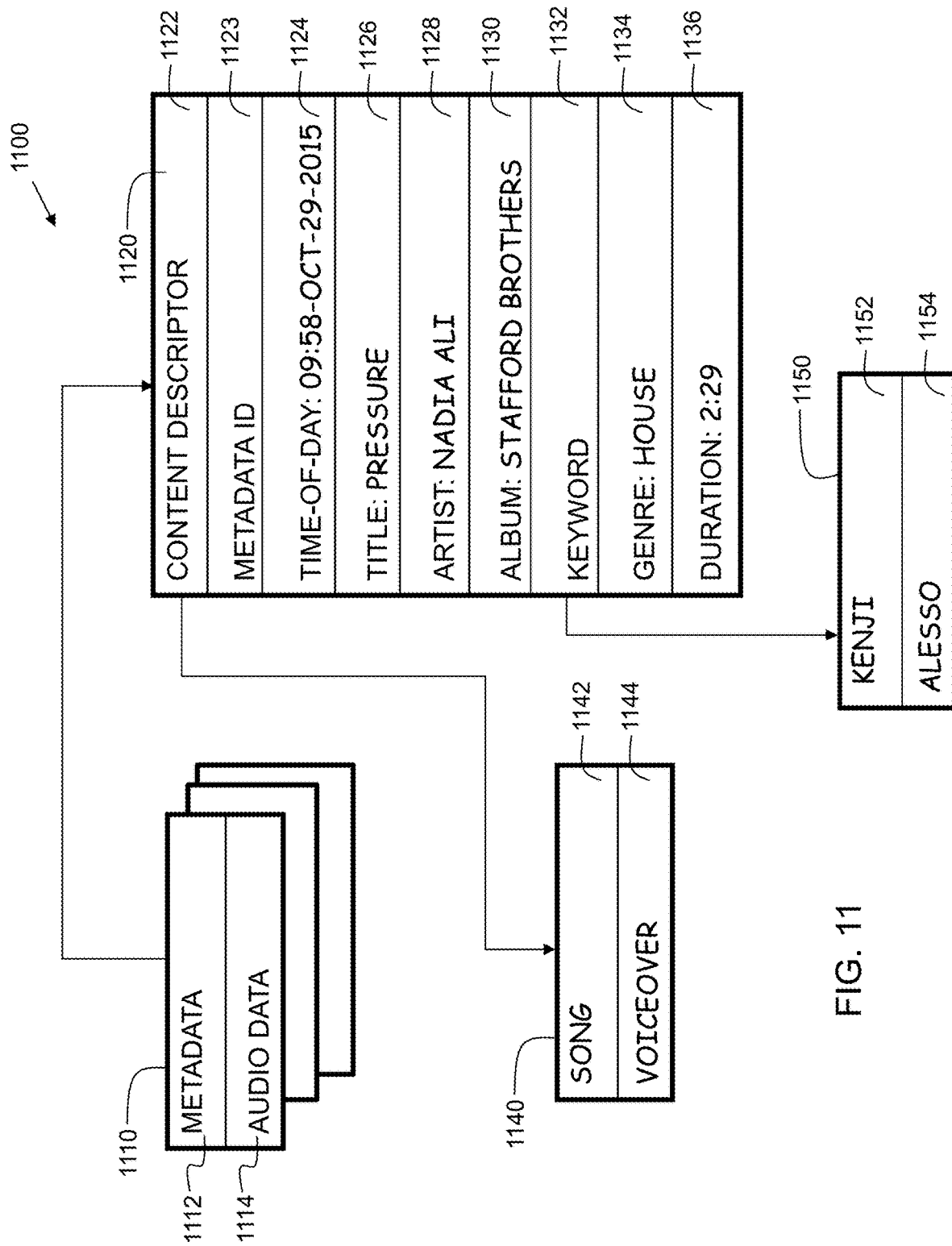
FIG. 11 shows example data structures in accordance with embodiments of the present invention.

FIG. 11 shows an example data structure 1100 in accordance with embodiments of the present invention. Data structure 1100 may be implemented using a variety of tables, including, but not limited to, XML, SQL, HTML, or other suitable technique. Audio file 1110 includes a metadata portion 1112 and an audio data portion 1114. The audio data portion 1114 includes audio data such as PCM (pulse code modulated) data, or compressed audio data in a format such as MP3, AAC, or another suitable format. Metadata 1112 includes multiple pieces of metadata in metadata structure 1120, which can include, but is not limited to, a content descriptor reference 1122, a metadata ID 1123, a time of day 1124, a title 1126, an artist 1128, an album 1130, a keyword reference 1132, a genre field 1134, and a duration field 1136. The content descriptor reference 1122 may point to a content descriptor record 1140 that can be dynamically sized to contain one or more content descriptor types pertaining to audio file 1110. In this example, two content descriptor types are present: song 1142 and voiceover 1144. The keyword reference 1132 may point to a keyword record 1150 that can be dynamically sized to contain one or more keywords pertaining to audio file 1110. In this example, two keywords are present: Kenji 1152 and Alesso 1154. The metadata ID 1123 may be utilized as an argument in API functions to allow convenient programmer access to various metadata information. The data structure 1100 is exemplary, and in some embodiments, more, fewer, or different fields and data structures may be used.

A variety of applications are possible with disclosed embodiments. For example, a sales executive can use disclosed embodiments to experience excerpts of the programming across all of the stations he sells. Hearing the shows helps him talk to clients and propose new sponsorship opportunities. The sales executive is able to check in on the performance of specific sponsorships to advocate for his clients. When on the road talking to current clients, he can play back the client's advertisements. When talking to prospective clients, he can play back representative advertisements of different available advertising formats, thereby increasing the chance of landing new sales contracts.

In another example, a station manager can listen to her announcers in dayparts when she is not listening to the station live. In the morning on the way in to work, she can listen to all of the morning show's voiceovers in a compact manner through her phone connected to her car's stereo, skipping over songs and commercials. She is able to listen to all of the voiceovers from the first three hours of the show during her 30-minute commute, becoming caught up with the entire show when she arrives at the station. In this way, the manager can be more effective in managing the output of the radio station.

As can now be appreciated, disclosed embodiments provide an improvement to the technical field of broadcast monitoring. A user can quickly find and review content based on time-of-day, and/or content descriptor type. This allows a user such as a radio station manager to quickly review advertisements, voiceovers, music selection, public service announcements, and/or other media items. Additionally, disclosed embodiments provide improvements in identifying and correlating a disc jockey, announcer, or other radio broadcaster with media items by associating credential information with time-of-day information and other metadata information for each media item. In this way, a digital record of radio station personnel responsible for generating radio station content at a particular time is established, allowing for greater transparency and accountability in radio station operations.

Although the invention has been shown and described with respect to a certain preferred embodiment or embodiments, certain equivalent alterations and modifications will occur to others skilled in the art upon the reading and understanding of this specification and the annexed drawings. In particular regard to the various functions performed by the above described components (assemblies, devices, circuits, etc.) the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more features of the other embodiments as may be desired and advantageous for any given or particular application.

What is claimed is:

1. An electronic device, comprising: a processor; a memory coupled to the processor, the memory containing instructions, which when executed by the processor, perform the steps of:
receiving a plurality of audio data files associated with a radio station, wherein each of the plurality of audio data files includes associated time-of-day information;
receiving user credentials from a credential reader for a broadcast booth on the premises of the radio station, wherein the user credentials include a user name;
receiving one or more pieces of metadata, wherein each of the one or more pieces of metadata comprises a start time and an end time;
associating each of the one or more pieces of metadata and the user name with one or more audio data files based on the time-of-day information;
receiving a login event from a computer device;
receiving a tally-on event from a broadcast console device;
associating the tally-on event with the time-of-day information and the login event;
receiving a tally-off event from the broadcast console device;
associating the tally-off event with the time-of-day information and the tally-on event; computing a duration based on the tally-on event and the tally-off event; and
creating a media item including a content descriptor, wherein the media item contains information including the tally-on event, tally-off event, and login event, and categorizing the media item as a voiceover track;
associating the voiceover track with the user name received from the credential reader; and
associating the media item and content descriptor with one or more audio data files based on the associated time-of-day information.

2. The electronic device of claim 1, wherein the memory further comprises instructions, that when executed by the processor, perform the steps of:
receiving a search query, wherein the search query includes a time of day;
identifying one or more of the plurality of audio data files having associated metadata that matches the search query; and
outputting an audio stream comprised of the one or more of the plurality of audio data files having associated metadata that matches the search query.

3. An electronic device, comprising: a processor; a memory coupled to the processor, a broadcast console interface, the memory containing instructions, which when executed by the processor, perform the steps of:
receiving an audio signal associated with a radio station;
compressing the audio signal;
creating a plurality of audio files, wherein each audio file comprises a portion of the compressed audio signal;
receiving user credentials from a credential reader for a broadcast booth on the premises of the radio station, wherein the user credentials include a user name;
receiving a login event from a computer device;
associating a time-of-day with each audio file; and transmitting each audio file to a server;
receiving a tally-on event from the broadcast console interface;
associating the tally-on event with the time-of-day and the login event;
receiving a tally-off event from the broadcast console interface;
associating the tally-off event with the time-of-day and the tally-on event;
computing a duration based on the tally-on event and the tally-off event; and creating a media item including a content descriptor, wherein the content descriptor media item contains information including the tally-on event, tally-off event, and login event, and categorizing the media item as a voiceover track;

associating the voiceover track with the user name received from the credential reader; and transmitting the media item and content descriptor to a server.

4. The device of claim 3 wherein the broadcast console interface comprises a contact closure interface.

5. The device of claim 3, wherein the memory further comprises instructions, that when executed by the processor, perform the step of compressing the audio signal into an AAC format.

6. The device of claim 3, wherein the memory further comprises instructions, that when executed by the processor, perform the step of compressing the audio signal into an mp3 format.

\* \* \* \* \*